US010736308B2

(12) United States Patent
Schramski

(10) Patent No.: US 10,736,308 B2
(45) Date of Patent: Aug. 11, 2020

(54) ICE FISHING TIP UP FISHING LINE SYSTEM

(71) Applicant: Firehouse Products LLC, Cumberland, WI (US)

(72) Inventor: Martin J. Schramski, Cumberland, WI (US)

(73) Assignee: Firehouse Products LLC, Cumberland, WI (US)

(*) Notice: Subject to any disclaimer, the term of this patent is extended or adjusted under 35 U.S.C. 154(b) by 727 days.

(21) Appl. No.: 14/607,479

(22) Filed: Jan. 28, 2015

(65) Prior Publication Data

US 2015/0208633 A1 Jul. 30, 2015

Related U.S. Application Data

(60) Provisional application No. 61/933,500, filed on Jan. 30, 2014.

(51) Int. Cl.
*A01K 97/01* (2006.01)
*A01K 97/12* (2006.01)

(52) U.S. Cl.
CPC ............ *A01K 97/01* (2013.01); *A01K 97/125* (2013.01)

(58) Field of Classification Search
CPC ........ A01K 97/01; A01K 97/12; A01K 97/10; A01K 97/11; A01K 97/125; F16M 11/32; F16M 11/24; F16M 11/34
USPC .................. 43/17, 4, 4.5, 16, 21.2, 15, 17.5; 248/163.1, 423, 460
See application file for complete search history.

(56) References Cited

U.S. PATENT DOCUMENTS

| | | | | |
|---|---|---|---|---|
| 1,264,000 A | * | 4/1918 | Bernhardt | A01K 97/125 43/17 |
| 3,230,655 A | | 1/1966 | Nomsen | |
| 3,645,029 A | | 2/1972 | Roemer | |
| 4,011,880 A | * | 3/1977 | Shoults | E04H 15/24 135/100 |
| 4,236,339 A | * | 12/1980 | White | A01K 97/10 43/17 |
| 4,570,886 A | * | 2/1986 | Mooney | F16M 11/34 248/186.1 |
| 5,107,614 A | | 4/1992 | Gonnello | |
| 5,235,773 A | | 8/1993 | Rinehart | |

(Continued)

OTHER PUBLICATIONS

Office action from related Canadian application No. 2,880,535 dated Jan. 19, 2016 (5 pages).

*Primary Examiner* — Peter M Poon
*Assistant Examiner* — Jeffrey R Larsen
(74) *Attorney, Agent, or Firm* — Christensen, Fonder, Dardi & Herbert PLLC

(57) ABSTRACT

An ice fishing tip-up is described that is adapted to rest on a sheet of ice surrounding a fishing opening in the sheet of ice. The ice fishing device has at least three legs, a moveable spool post, a fishing line spool attached at or near the water end of the moveable spool post, and a signaling device comprising a switch operably connected to the fishing line spool. Each leg is attached at one end to a top cap. The moveable spool post has a first and a second position. The first position of the movable spool post the fishing line spool is positioned in the interior defined by the legs and at the second position of the movable spool post the fishing line spool extends past the legs. Pulling on the fishing line spool activates the switch to trigger the signaling device.

18 Claims, 6 Drawing Sheets

(56) References Cited

U.S. PATENT DOCUMENTS

| | | |
|---|---|---|
| 5,448,850 A | 9/1995 | Gonnello |
| 5,564,213 A | 10/1996 | Rinehart |
| 6,463,691 B1 | 10/2002 | Atkins |
| 7,263,797 B1 | 9/2007 | Trillo |
| 7,395,628 B2 | 7/2008 | Rayfield |
| 7,430,968 B2 | 10/2008 | Clark |
| 8,262,049 B2 | 9/2012 | Evanoff |
| 8,550,100 B1 | 10/2013 | Lindholm |
| 2004/0237374 A1* | 12/2004 | Klein ................ A01K 97/01 43/21.2 |
| 2009/0272022 A1 | 11/2009 | Grega |
| 2012/0186619 A1 | 7/2012 | Makos |
| 2013/0227873 A1* | 9/2013 | Coulson ............ A01K 97/125 43/17 |
| 2014/0090287 A1 | 4/2014 | Olson et al. |
| 2015/0208635 A1* | 7/2015 | Hondl ................ A01K 89/015 43/17 |

* cited by examiner

ICE FISHING TIP UP FISHING LINE SYSTEM

CROSS REFERENCE TO RELATED APPLICATIONS

This application claims priority to U.S. Provisional Application No. 61/933,500 filed on Jan. 30, 2014 to Schramski, entitled "Ice Fishing Tip Up Fishing Line System," incorporated herein by reference.

FIELD OF THE INVENTION

The invention relates to a tip-up for ice fishing.

BACKGROUND OF THE INVENTION

Ice fishing generally involves placement and support of a spool for the fishing line having a hook on the end. After a fish is on the hook, the line is retrieved to harvest the fish. The fishing is performed through a hole made through ice on the surface of a frozen body of water, and the fishing experience involves potentially harsh conditions. Devices can be used to facilitate the sport under the encountered conditions on the ice.

SUMMARY OF THE INVENTION

In one embodiment the invention pertains to an ice fishing device adapted to rest on a sheet of ice surrounding a fishing opening in the sheet of ice. The ice fishing device has at least three legs, a moveable spool post, a fishing line spool attached at or near the water end of the moveable spool post, and a signaling device comprising a switch operably connected to the fishing line spool. Each leg generally is attached at one end to a top cap. The moveable spool post has a first and a second position. The first position of the movable spool post the fishing line spool is positioned in the interior defined by the legs and at the second position of the movable spool post the fishing line spool extends past the legs. Pulling on the fishing line spool activates a switch to trigger the signaling device.

In another aspect, the invention pertains to a method for ice fishing using a fishing device. The fishing device comprises a plurality of legs supporting a spool post with a fishing line spool. First the ends of the legs opposite the top cap are placed on a sheet of ice over a body of water with the legs straddling a hole through the sheet of ice. Next, the fishing line spool is placed into the opening in the sheet of ice so that the fishing line spool is submerged in water under the sheet of ice. The signaling device is then set so that pulling on the fishing line spool will activate the switch.

DETAILED DESCRIPTION OF THE INVENTION

Figure 1A:
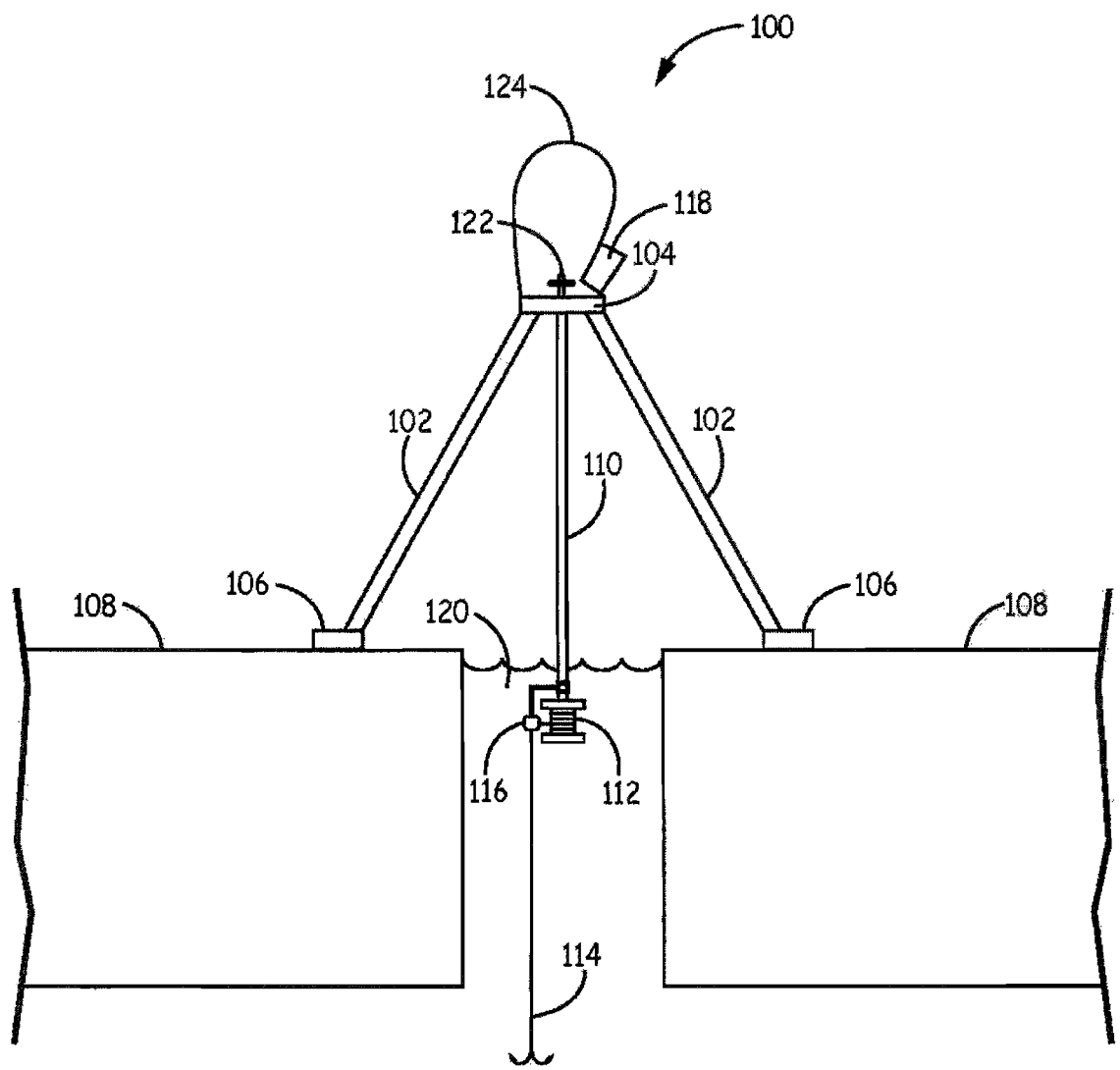
FIG. 1A is a side view of an embodiment of a tip-up with the movable spool post attached at the top cap and signaling with a flag in which a cross section is taken through the sheet of ice to show the relationship of the device to the ice.

A tip up structure described herein provides a relatively easy to set up system for facilitating the ice fishing experience. The tip up structure may comprise the following elements: a frame, a reel holder, signaling devices and a fabric cover to shelter the components. In some embodiments, the frame can have a teepee or tripod (multi-pod) shape with three or more legs, which in other words implies that the legs get closer together toward the top relative to the leg configuration placed on the ground when properly deployed. The reel holder can have variable positioning vertically so that the spool can be raised or lowered. Indicators can provide signaling to the user. The various components or reasonable portions thereof can be self-contained or attached for easier set up and removal. The tip up device provides significant improvements, including more freezing prevention ability, ease of use and signaling options in comparison with the device described in published U.S. patent application 2009/0272022 to Grega, entitled "Ice Fishing Tip-Up," incorporated herein by reference. The '022 application describes a tip-up that is a ring that lays flat on the ice around the opening in the ice. The signaling device in the '022 application is a lever that pivots on a point. When the fishing line is pulled, the arm is pulled down and the flag is raised like a see-saw. In contrast, the presently described tip-up has a teepee or tripod shape and the signal mechanism is controlled through the vertical motion of the post.

With respect to the frame, the embodiment shown in the figures have three legs, but in other embodiments, the frame can have four legs, five legs or more. An embodiment with eight legs is shown in the drawings, and this spider version can have 6, 7, 8, 9, 10 or more legs. The frame can be made to comprise hinges or the like to provide for folding of the frame into a more compact configuration. Hinges suitable for tripod mounts or generalized versions with more than three legs are known or can be readily designed. An example of mounts for a tripod design are described, for example, in U.S. Pat. No. 8,262,049 to Evanoff, entitled "Portable Stand," which further describes foldable supports between the legs and a central column, and U.S. Pat. No. 7,430,968 to Clark, entitled "Folding Work Platform," both of which are incorporated herein by reference. In some embodiments, the ends of the legs can have pads or anchors to help to stabilize the deployed device. The pads can hold the device in place by weight and/or anchors can pierce the surface of the ice to provide for anchoring of the device to the ice. Anchors can have screw(s), spike shapes or the like. Anchors can be directly attached to feet near the bottom of legs or attached with tethers or the like, which can be ropes, wires or the like with screws, spikes or other gripping element at or near the end of the tether. The frame can be covered with a woven or non-woven fabric or the like to shelter the components supported within the device, and such covers can be sewn into place, releasably attached such as with hooks, clamps, hook and loop fasteners, e.g., Velcro, or other convenient fastener, or placed like a cover with as a single piece held in place by the frame. Alternatively, solid structural elements can attach as walls to the legs to similarly shelter the interior of the structure and releasable attachment of such walls can be made with a selected fastener, such as snaps, hooks, hook and loop fasteners, or other convenient fastener.

In some embodiments the legs may be made from a curved plastic. In such embodiments, when the tip-up is folded the curved shape of the tip-up may collapse into a self-contained cylinder or other shape with the legs acting as the outer wall of the cylinder or other shape.

A support structure for the reel generally is attached itself to the legs directly or indirectly. The support structure can comprise foldable support beams and an adjustable reel support pole supportable by the support beams. The support beams can attached to the legs and support the reel support pole. An attachment clasp can provide the interface between the support beams and the reel support pole. Various designs of the attachment clasp can provide for the raising or lowering of the reel support pole. For example, a manual screw can be tightened to secure the support pole or loosened to release the support pole for raising or lowering of the support pole. In other embodiments, support beams can have a notch removed from the end attached to the leg under the pivot post. The support beam is attached by a pivot post to the legs and by a second pivot post to the movable spool post. When the tip-up is unfolded, support beam pivots on the post freely until the notch comes into contact with the legs. At that point, the contact prevents the tip-up from unfolding further. The reel generally is attached at or near one end of the reel support pole, which is oriented toward the hole in the ice when the tip up is deployed. Lowering of the reel support pole can result in the lowering of the reel into the water through the hole in the ice, and raising of the reel support pole can result in the raising of the reel for the harvesting of a fish, for the preparation of the hook, for the leaving of the tip up in an unused resting status and/or for the packing up of the tip up. The attachment clasp can comprise various mechanisms to provide for the lowering and raising of the reel support pole, based on friction, a pivoting mechanism, a mechanical locking mechanism and release, a motorized drive, or the like. In some embodiments, the attachment clasp can comprise a spring loaded device that is loaded by pulling the reel support pole down to a stop point to load the spring. The stop can be manually released to raise the reel support pole and/or automatically triggered by a switch when indications suggest the hooking of a fish. The design of the tip up with the shelter provided by the wall/sheeting as well as lowing of the reel into the water for use can avoid freezing of the reel. Other mechanisms can be designed to reduce the effects of any freezing.

In some embodiments, the spool is attached to a moveable spool post. The moveable spool post may be a two part post with a rod nested inside a tube. The rod may be longer than the tube and may terminate in a cap that is slightly larger than the diameter of the interior circumference of the tube on one end and the spool on the other. A spring may be placed inside the tube so that when there is not tension on the fishing line the cap is not in contact with the tube. When tension is applied to the fishing line, the spring is compress and the cap is brought into contact with the tube. The contact may be used to trigger a signal. In additional embodiments the cap is a T-shaped post with notches on the underside of the post. A spring is placed between the T-post and the top of the tube to provide tension. A flag with a post and spring may be used to signal and to trigger an electric signal. In embodiments with this construction, the flag spring is folded over and the flag post is placed in a notch under the T-post. When the line and spool are pulled, the rod twists, releasing the flag post from the notch. The folded spring returns to a vertical position. If an electric signal is also used, the flag post can be used to complete a circuit or to activate a switch that turns on the electrical signal.

The reel can include a trigger or other sensor to detect the likely presence of a hooked fish. Alternatively or additionally, a switch can be triggered by a motion detector or the like. The triggering of the fish sensor can lock the reel to prevent further line unwinding from the reel, trip the raising of the reel support pole to raise the reel from the water by way of a loaded spring or other mechanism, and/or provide a visible and/or audio signal to indicate to the user that a fish is hooked. Suitable signals include, for example, an audio alarm, a flag or other visible indicia, and/or lights, such as LED lights or other lighting system. Various electrical components can be operated by a battery or series of batteries, such as one or more rechargeable batteries, that can be connected in parallel and/or in series to provide a desired voltage and capacity. In some embodiments, a solar cell can be mounted on the exterior of the frame to provide for recharging of batteries. In additional embodiments the signal system may be wirelessly connected to a personal electronic device (Bluetooth etc.).

In general, a particular embodiment can be used by first reaching in the bottom of the tip-up and pull down on the spool of line until it stops. The movable spool post will stop at full extension. Next, a user can bait the hook if desired and unspool the line to desired depth. After unspooling the line, a user sets the stopper switch. Setting the stopper switch stops the line from unspooling. Additionally, setting the stopper switch allows the motion of a fish strike to trigger the signaling mechanism. At an appropriate time, the tip-up is positioned to lower the spool into the hole in the ice and the signaling mechanism is set. The steps can be reversed to remove and store the tip-up. When the signal indicates that a fish is on the line, the spool may be raised out of the water and the line pulled up out of the water.

Figure 1B:
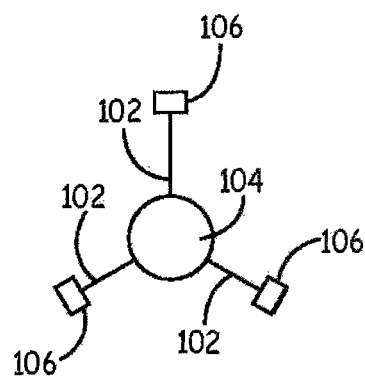
FIG. 1B is a top view of the tip-up in FIG. 1A.

In the embodiment in FIG. 1A tip-up 100 comprises at least three legs 102 attached to a top cap 104. Legs 102 terminate at foot 106 which rests on ice sheet 108, such that legs 102 do not directly rest on ice sheet 108. FIG. 1B is a top view of the embodiment of FIG. 1A. Moveable spool post 110 is attached at one end to top cap 104 and at the other end to fishing line spool 112. Fishing line and hook 114 is wound around fishing line spool 112 and threaded through stopper switch 116. Flag 118 is attached to top cap 104.

In this embodiment, legs 102 are attached to top cap 104 by a hinge or similar mechanism and may be locked in place at a predetermined angle, although constraints on movement of the legs may additionally or alternatively set the angle of the legs in a deployed configuration. Tip up 100 is positioned on ice sheet 108 over opening 120. When positioned for active fishing, fishing line spool 112, stopper switch 116, and fishing line and hook 114 generally are below the waterline. Tension activated switches for general fishing devices are described further in U.S. Pat. No. 6,463,691 to Atkins, entitled "Magnetically Actuated Indicator Device for a Fishing Rod and Fishing Rig Incorporating the Device, and Method of Using the Same," and U.S. Pat. No. 7,263,797 to Trillo, entitled "Fishing Lure with Tension Activated Light," both of which are incorporated herein by reference, and such tension activated switches or other designs if desired can be adapted for the present apparatus. Flag 118 is set by bending resilient pole 124 and clasping the flag end into to release mechanism 122. The line is set by engaging the stopper switch 116, which keeps the fishing line and hook 114 from extending farther. When a fish pulls on the fishing line and hook 114, spool 112 and moveable spool post 110 are pulled downward releasing flag 118 from release mechanism 122.

Figure 2:
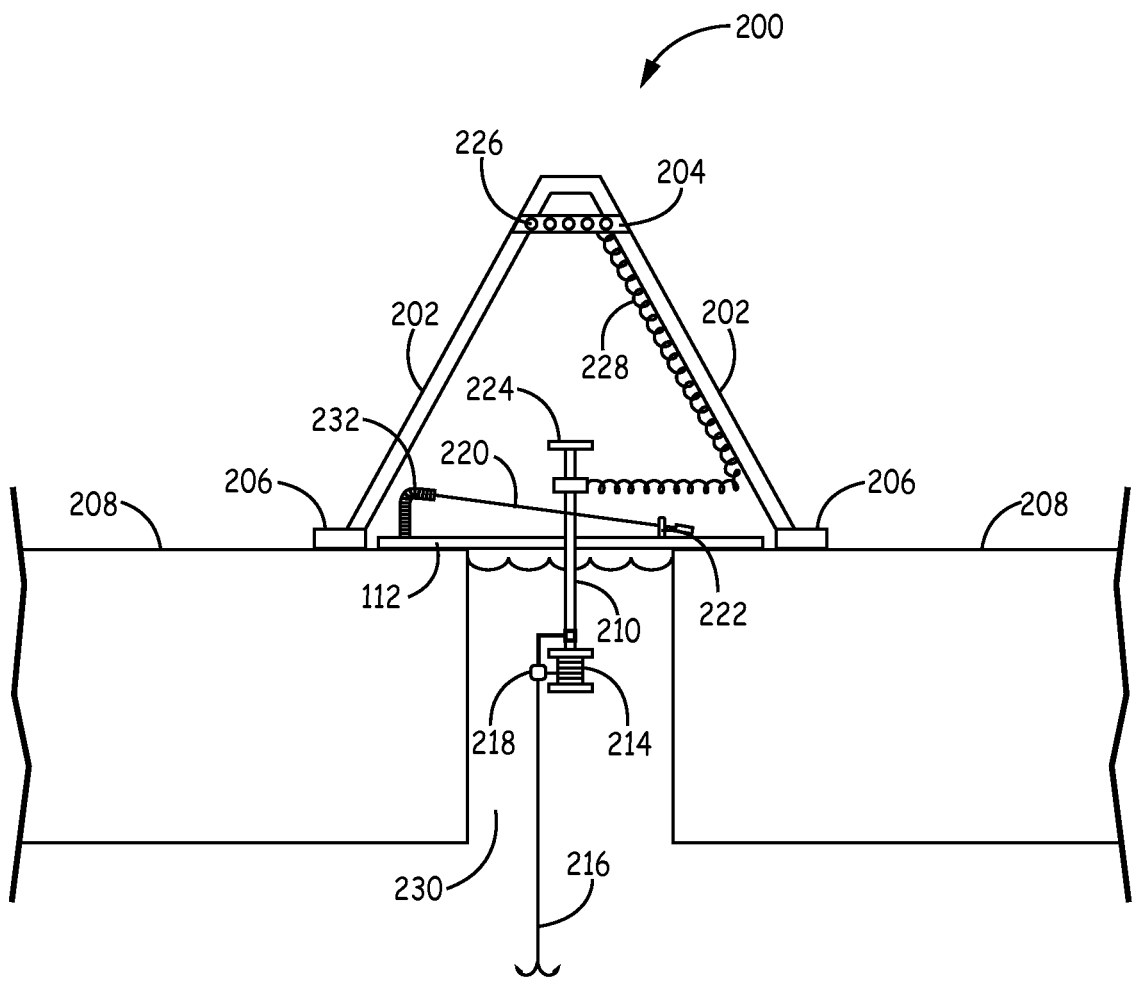
FIG. 2 is a side view of another embodiment of a tip-up with the movable spool post attached to a flag base and signaling with a flag and lights.

In FIG. 2, the embodiment has a dual signaling system. Tip-up 200 comprises at least three legs 202 attached to a top cap 204. In this embodiment, legs 202 terminate at foot 206 which rests on ice sheet 208. Legs 202 do not rest directly on ice sheet 208, although in alternative embodiments legs of the tip-up can sit on the ice. Moveable spool post 210 is attached part way along the length to flag base 212 and at the ice end to fishing line spool 214. Fishing line and hook 216 is wound around fishing line spool 214 and threaded through stopper switch 218. Flag 220 is attached to flag base 212 and held in place by release mechanism 222. Trigger switch 224 is attached at the top of movable spool post 210. Trigger switch 224 is electrically connected to lights 226 in top cap 204 by wire 228.

In this embodiment, legs 202 can be attached to top cap 204 by a hinge or similar mechanism and extended outward for placement at a predetermined angle. In use, tip-up 200 is positioned on ice sheet 208 over opening 230. Fishing line spool 214, stopper switch 218, and fishing line and hook 216 can be positioned below the waterline. Flag 220 is set by bending spring 232 and clasping the flag end into to release mechanism 222. The line is set by engaging the stopper switch 218, which keeps the fishing line and hook 216 from extending farther. When a fish pulls on the fishing line and hook 216, spool 214 and moveable spool post 210 are pulled downward releasing flag 220 from release mechanism 222 and completing the electrical circuit between trigger switch 224 and lights 226, turning on lights 226.

Figure 3:
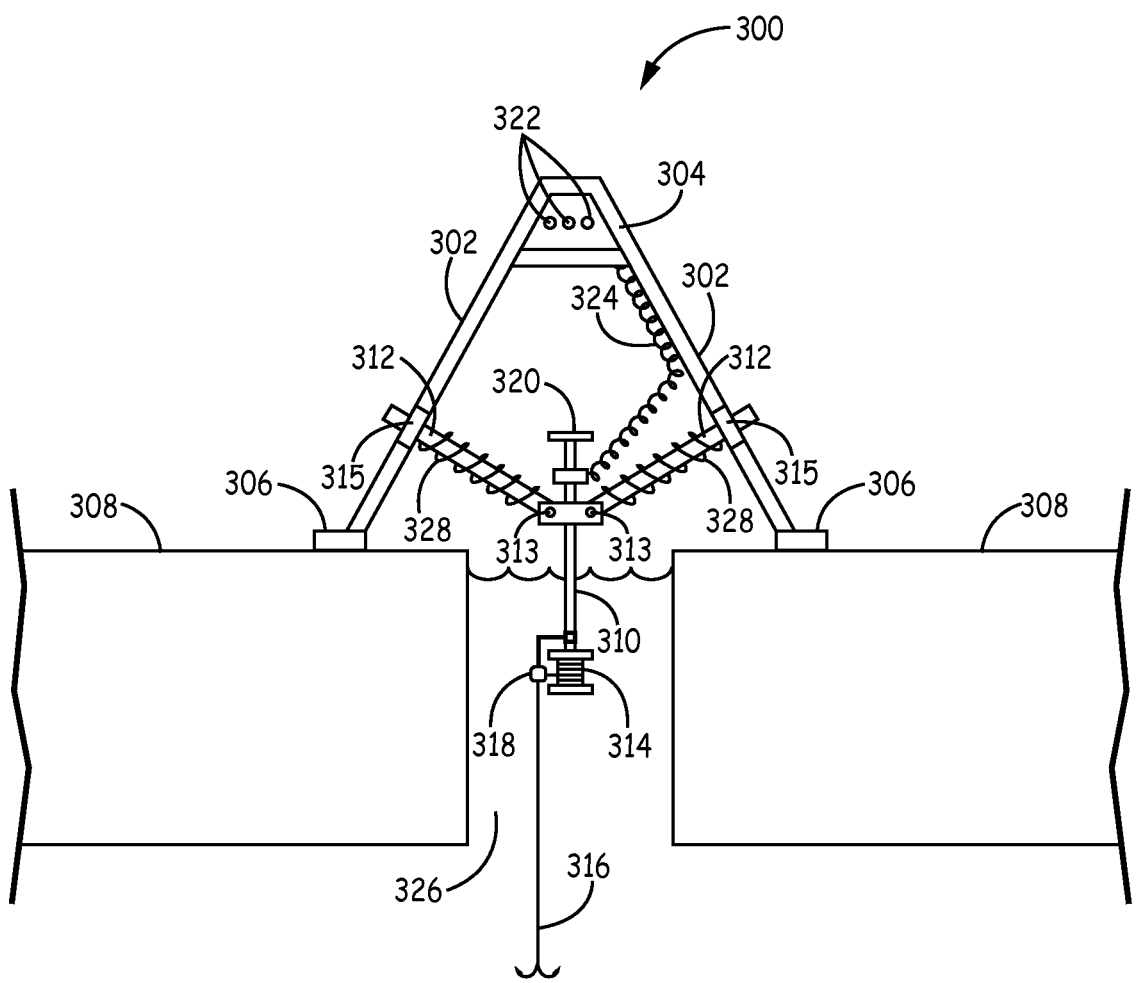
FIG. 3 is a side view of an embodiment of a tip-up with the movable spool attached to the legs by spring loaded arms and signaling by lights.

In FIG. 3, the embodiment of the tip up device has an electrical signal system. Tip-up 300 comprises at least three legs 302 attached to a top cap 304. Legs 302 terminate at foot 306 which rests on ice sheet 308. Legs 302 do not rest directly on ice sheet 308. Moveable spool post 310 is attached part way along the length to spring loaded arms 312 by a post rotational joint 313 and at or near the ice end to fishing line spool 314. Spring loaded arms 312 are attached to legs 302 by a leg rotational joint 315 allowing for movement relative to legs 302 and movable spool post 310. Rotational joints 313 and/or 315 can be biased with stops at the two positions of the spool post and/or the weights of the elements can be balanced, such as with extra weight on the ends of arms 312, so that the two positions of the spool post 310 are relatively stable at the two positions. Fishing line and hook 316 is wound around fishing line spool 314 and threaded through stopper switch 318. Trigger switch 320 is attached at the top of movable spool post 310. Trigger switch 320 is electrically connected to lights 322 in top cap 304 by wire 324.

In this embodiment, legs 302 can be attached to top cap 304 in a fixed position, so that this embodiment does not fold. In use, tip-up 300 is positioned on ice sheet 308 over opening 326. In one position, fishing line spool 314, stopper switch 318, and fishing line and hook 316 are below the waterline. Trigger switch 320 is turned on. Spring loaded arms 312 hold movable spool post 310 in a slightly elevated position until fishing line and hook 316 is pulled by a fish. The line is set by engaging the stopper switch 318, which keeps the fishing line and hook 316 from extending farther. When a fish pulls on the fishing line and hook 316, spool 314 and moveable spool post 310 are pulled downward extending springs 328 in spring loaded arms 312. This motion completes the electrical circuit between trigger switch 320 and lights 322, turning on lights 322.

Figure 4A:
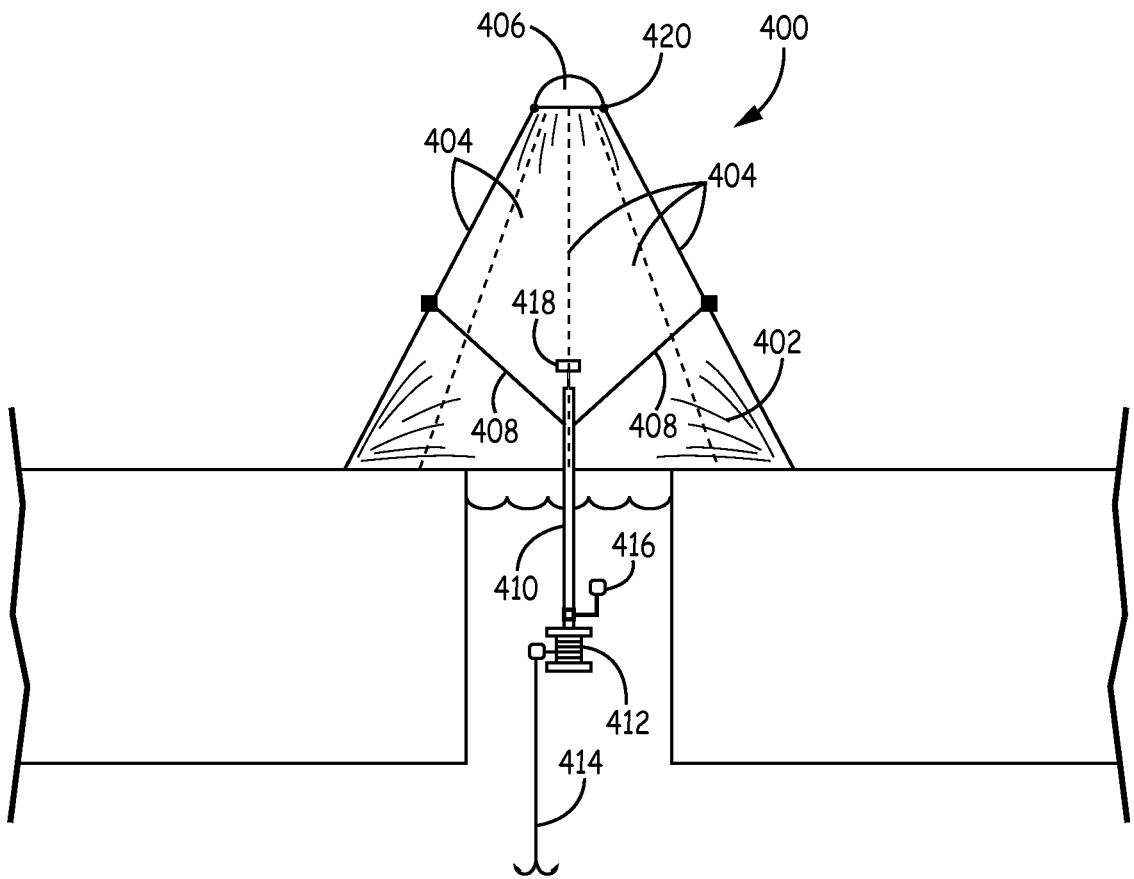
FIG. 4A is a side view of an embodiment of a tip-up with a fabric cover.

The embodiment of the tip up in FIG. 3 may include a fabric cover, as depicted in FIG. 4A. In FIG. 4A, tip-up 400 has cloth cover 402 over three or more legs 404 attached to top cap 406. Legs 404 are attached to top cap 406 by hinge 420 or similar mechanism and can be locked in place at a predetermined angle. Under cover 402, spring loaded arms 408 are attached to legs 404 by a rotational joint allowing for movement relative to legs 404 and movable spool post 410. Moveable spool post 410 is attached part way along the length to spring loaded arms 408 by a rotational joint and at the ice end to fishing line spool 412. Fishing line and hook 414 is wound around fishing line spool 412 and threaded through stopper switch 416. Trigger switch 418 is attached at the top of movable spool post 410. Trigger switch 418 wirelessly communicates with lights in top cap 406 or a personal wireless device.

Figure 4B:
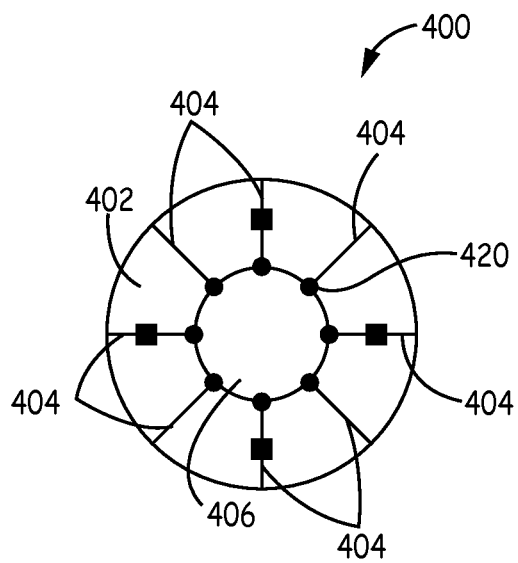
FIG. 4B is a top view of the tip-up in FIG. 4A.
Figure 4C:
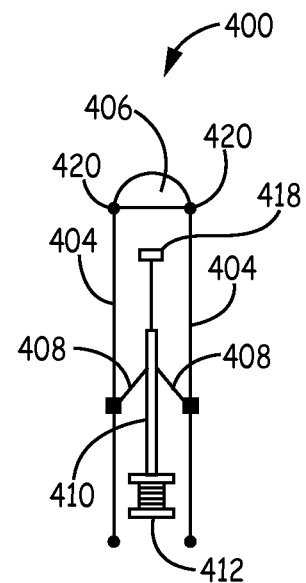
FIG. 4C is a side view of the tip-up of FIG. 4A collapsed for storage.

FIG. 4B is a top view of the covered embodiment in FIG. 4A. With the hinge 420 and spring loaded arms 408, tip-up 400 can be collapsed as shown in FIG. 4C. When collapsed, moveable post 410 is moved up so that it is positioned between legs 404 and does not extend beyond them.

Figure 5A:
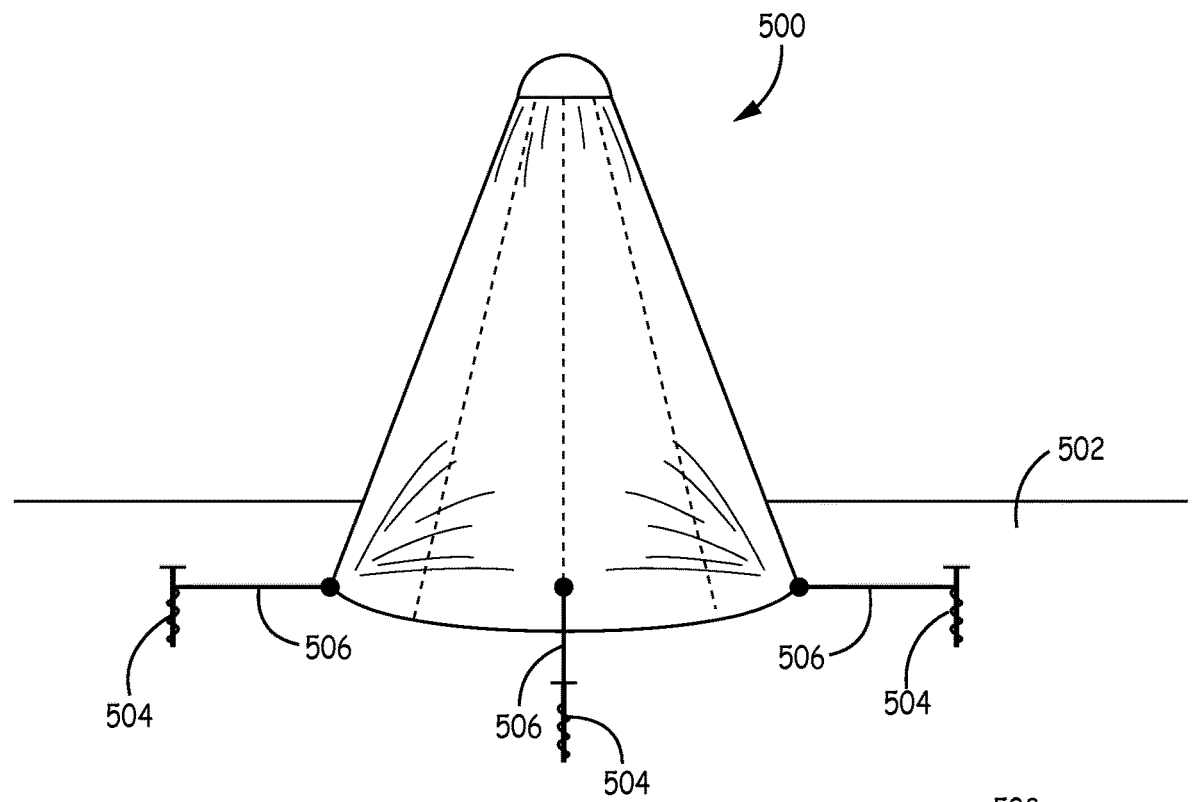
FIG. 5A depicts a tip-up anchored to an ice sheet.
Figure 5B:
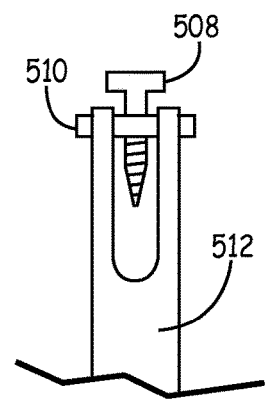
FIG. 5B depicts a close up view of the anchors in FIG. 5A.

In FIG. 5A, tip-up 500 is further secured to ice sheet 502 by ice anchor 504. Ice anchor 504 attached to tip-up 500 by a cable 506 and screwed into ice sheet 502. In alternative embodiments, an ice anchor can be a spike or the like pounded into the ice or other suitable gripping structure. FIG. 5B is an enlarged view of one of the ice anchors. In ice anchor 504, screw 508 is attached to post 510. The post is inserted through holes in fork joint 512 so that it can rotate freely. Fork joint 512 is then attached to cable 506.

Figure 6:
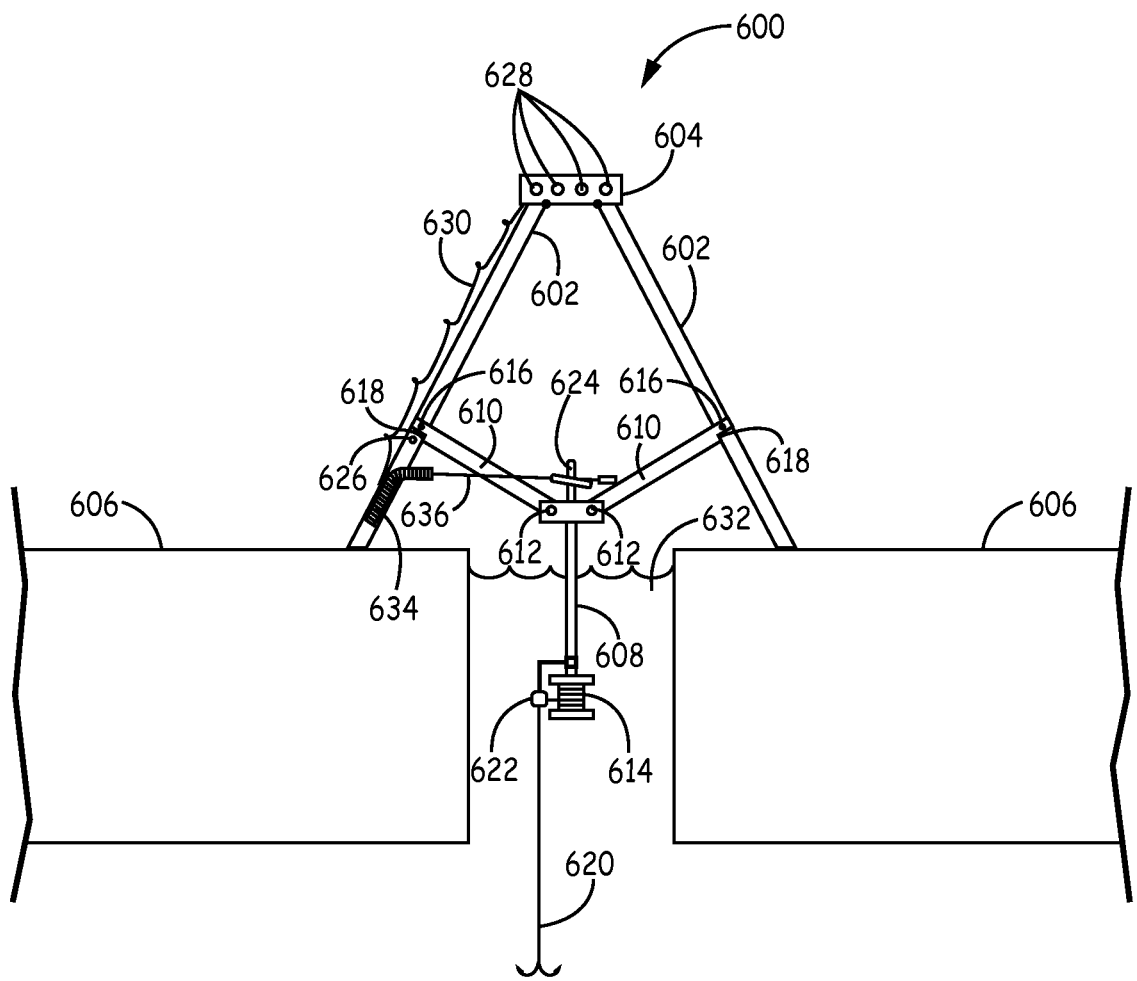
FIG. 6 is a side of another embodiment of a tip-up with the movable spool attached to support beams and signaling with a flag and lights.

In FIG. 6, the embodiment of the tip up device has a physical and an electrical signal system. Tip-up 600 comprises at least three legs 602 attached to a top cap 604. Legs 602 sit on ice sheet 606 on one end. Moveable spool post 608 is attached part way along the length to support beams 610 by a post rotational joint 612 and at or near the ice end to fishing line spool 614. Support beams 610 are attached to legs 602 by a leg rotational joint 616 allowing for movement relative to legs 602 and movable spool post 608. Support beams 610 have notch 618 in the end attached to legs 602. When tip-up 600 is unfolded, support beam 610 pivots on the leg rotational joint 616 freely until notch 618 comes into contact with the leg 602. At that point, the contact prevents tip-up 600 from unfolding further. Fishing line and hook 620 is wound around fishing line spool 614 and threaded through stopper switch 622. T-Post 624 is attached at the top of movable spool post 608. Trigger switch 626 is electrically connected to lights 628 in top cap 604 by wire 630.

In this embodiment, legs 602 can be attached to top cap 604 by a hinge or similar mechanism and extended outward for placement at a predetermined angle. In use, tip-up 600 is positioned on ice sheet 606 over opening 632. In one position, fishing line spool 614, stopper switch 622, and fishing line and hook 620 are below the waterline. The line is set by engaging the stopper switch 622, which keeps the fishing line and hook 620 from extending farther. The trigger is set by bending flag spring 634 and placing flag post 636, under T-post 624. When fishing line and hook 620 is pulled by a fish, spool 614, moveable spool post 608, and T-post 624 are pulled downward and are slightly rotated. This motion removes T-post 624 from the top of flag post 636. Tension in flag spring 634 then returns flag post 636 to a vertical orientation, where it hits trigger switch 626. Hitting trigger switch 626 completes the electrical circuit between trigger switch 626 and lights 628, turning on lights 628.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An ice fishing device adapted to rest on a sheet of ice surrounding a fishing opening in the sheet of ice comprising:
   at least three legs with two ends and a length between the two ends wherein each leg is attached at one end to a top mount and attached on the length to a support arm;
   a moveable spool post with a top end and a bottom end, the moveable spool post having a first position and a second position; wherein the moveable spool post is attached to the support arms;
   a fishing line spool attached at or near the bottom end of the moveable spool post, wherein at the first position of the movable spool post the fishing line spool is positioned in an interior defined by the legs and at the second position of the movable spool post the fishing line spool extends past the legs; and
   a signaling device comprising a switch operably connected to the fishing line spool; wherein pulling on the fishing line spool moves the movable spool post in a downward direction and activates the switch to trigger the signaling device.

2. The ice fishing device of claim 1 wherein the legs are fixed relative to each other.

3. The ice fishing device of claim 1 wherein the signaling device comprises a light emitting diode.

4. The ice fishing device of claim 1 wherein the signaling device comprises a flag.

5. The ice fishing device of claim 1 wherein the signaling device comprises a light emitting diode and a flag, wherein the release of the flag turns on the light emitting diode.

6. The ice fishing device of claim 1 wherein the movable spool post is attached to the legs.

7. The ice fishing device of claim 1 wherein the movable spool post is attached to the legs by the support arms wherein the support arms do not move past a predetermined angle.

8. The ice fishing device of claim 7 wherein the support arms have a notch that props the support arm against the leg, preventing it from moving further in one direction.

9. The ice fishing device of claim 1 wherein the movable spool post is attached to the top mount.

10. The ice fishing device of claim 1 wherein the legs are attached to the top mount by a hinge.

11. The ice fishing device of claim 1 further comprising a cover extending between two legs.

12. The ice fishing device of claim 1 further comprising at least one ice anchor attached to one of the legs at the end opposite the top mount.

13. A method for ice fishing using a fishing device having a first position and second position, the fishing device comprising a signaling device, a switch, and three or more of legs supporting a spool post with a fishing line spool, wherein the legs have two ends and a length between the two ends wherein each leg is attached at one end to a top mount and attached on the length to a support arm, wherein the support arms are attached to the spool post, and at a first position of the movable spool post the fishing line spool is positioned in an interior defined by the legs and at a second position of the movable spool post the fishing line spool extends past the legs, the method comprising:
   placing the ends of the legs opposite the top mount on a sheet of ice over a body of water with the legs straddling a hole through the sheet of ice, and the support arms extending between the legs and the spool post;
   placing the fishing line spool into the opening in the sheet of ice; and
   setting the signaling device so that pulling on the fishing line spool such that the movable spool post moves in a downward direction and activates the switch.

14. The method of claim 13 further comprising anchoring the legs to the sheet of ice using anchors attached at or near the end of the legs opposite the top mount.

15. The method of claim 13 wherein the legs have a first position and a second position, further comprising unfolding the legs from the first position to the second position prior to placing the ends of the legs opposite the top mount on a sheet of ice.

16. The method of claim 13 further comprising submerging the fishing line spool in water under the sheet of ice.

17. The method of claim 16 further comprising raising the fishing line spool out of the hole after the switch is activated.

18. The method of claim 17 wherein a fishing line is wound around the fishing line spool, further comprising reeling in the fishing line onto the spool to harvest a fish after the fishing line spool is raised out of the hole.

* * * * *